(12) United States Patent
Koyama

(10) Patent No.: US 6,505,116 B1
(45) Date of Patent: *Jan. 7, 2003

(54) MAP DISPLAY

(75) Inventor: Yoshimi Koyama, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/631,555

(22) Filed: Aug. 3, 2000

(30) Foreign Application Priority Data

Aug. 4, 1999 (JP) ............................................ 11-221375

(51) Int. Cl.$^7$ ............................................... G01C 21/00
(52) U.S. Cl. ........................ 701/208; 701/207; 340/988
(58) Field of Search .................................. 701/207, 208, 701/211, 212, 213, 214; 78/178 R; 340/988, 990, 995

(56) References Cited

U.S. PATENT DOCUMENTS

| 4,713,767 A | * | 12/1987 | Sato et al. ................... 364/453 |
| 4,743,913 A | * | 5/1988 | Takai .......................... 342/457 |
| 5,359,527 A | * | 10/1994 | Takanabe et al. ........... 364/449 |

* cited by examiner

*Primary Examiner*—Yonel Beaulieu
(74) *Attorney, Agent, or Firm*—Jay H. Maioli

(57) ABSTRACT

A map display includes a display screen for displaying read map image data, an input for designating an absolute position obtained by a positioning device on a map displayed by the display screen, and a controller for calculating positions on the map corresponding to the absolute positions obtained by the positioning device based on the absolute positions of at least two points on the map designated by the input and for displaying the calculated positions on the map displayed on the display screen.

3 Claims, 8 Drawing Sheets

Point B: North Latitude 35° 53' 02"
East Longitude 138° 19' 20"

Point A: North Latitude 35° 52' 16"
East Longitude 138° 18' 50"

MAP DISPLAY

BACKGROUND OF THE INVENTION

1. Field of the Invention

The present invention relates to a preferable map display applied to a map display for displaying a position by utilizing a positioning system called GPS (Global Positioning System) for which satellites are used.

2. Description of the Related Art

Conventionally, various receivers for a positioning system called GPS for which satellites are used have been developed. Positioning by using this receiver is receiving positioning signals sent from a plurality of (about 24) artificial satellites orbiting the earth, demodulating information included in the positioning signals from the respective satellites, analyzing the information obtained by the demodulation, and carrying out positioning of a present position. In this case, the information included in the positioning signals sent from the respective satellites include time data of the satellites, orbit data for calculating positions of the satellites, and the like. The positioning signals including the information are sent after they are spread-spectrum modulated and quadrature-phase modulated by two carrier waves (two-phase PSK modulation). The same frequencies (1227.6 MHz and 1575.42 MHz) are used for all the satellites as frequencies of the two carrier waves and a code used for spread-spectrum modulation is different for each satellite.

Then, in positioning, the positioning signals are received at the same time from at least three satellites, the information included in the received positioning signals from the three satellites is demodulated, the demodulated information is analyzed, and a processing for positioning an absolute position such as longitude, latitude, and the like is carried out.

Various navigation systems for displaying a map of a vicinity of the present position by using such a system for carrying out positioning of the absolute position by the GPS have been developed. As the navigation system, there are a vehicle-mounted system mounted to a mobile body such as an automobile and a small-sized system formed for a carrying purpose.

Here, in the case of the vehicle-mounted navigation system, it is possible to carry out navigation by preparing a mass-storage device (e.g., an optical-disc playback device such as CD, DVD, and the like) in which electronic map data over a relatively wide range is stored and displaying the map of the vicinity of the present position read out from the storage device on a display connected to the storage device. On the other hand, in the case of the small-sized navigation system for the carrying purpose, if the mass-storage device is built into the system, a size of the system is increased and portability is impaired. Therefore, it is not preferable to build the mass-storage device in the system.

Therefore, it has been proposed to carry out navigation in the vicinity of the present position by combining a map displayed in a form of a printed map, for example, and position display by the navigation system. For example, it has been proposed to prepare a map printed on a transparent sheet in advance and to put the prepared map sheet on a display panel of the navigation system such that a position displayed on the display panel is displayed on the map.

However, in the case of the prior-art navigation system for which the map in the form of the printed map is used, only the maps prepared especially for the navigation system can be used. In other words, if the map does not have a scale, longitude, and latitude in preset states, the map does not correspond to the position display on the display panel of the navigation system, and therefore, accurate navigation cannot be carried out. Therefore, even though the navigation system itself is small-sized for the carrying purpose, it is necessary to carry the special maps with the system, and the system is not preferable as a portable system.

In view of the above points, it is an object of the present invention to make any maps usable for navigation.

SUMMARY OF THE INVENTION

To achieve the above object, according to the present invention, there is provided a map display comprising display means for displaying read map image data, input means for designating an absolute position obtained by positioning by positioning means on a map displayed on the display means, and control means for calculating positions on the map corresponding to the absolute positions obtained by positioning by the positioning means based on the absolute positions of at least two points on the map designated by the input means and for displaying the calculated positions on the map displayed by the display means.

According to the invention, the absolute coordinates positions of at least two points in the read map image data can be obtained by designation by the input means. Based on the relationships among the coordinates positions of the two points and the present position obtained by positioning by the positioning means, it is possible to judge to which point in the map image data the present position corresponds and to display the judged present position on the map.

DETAILED DESCRIPTION OF THE PREFERRED EMBODIMENTS

An embodiment of the present invention will be described below by reference to the accompanying drawings.

Figure 1:
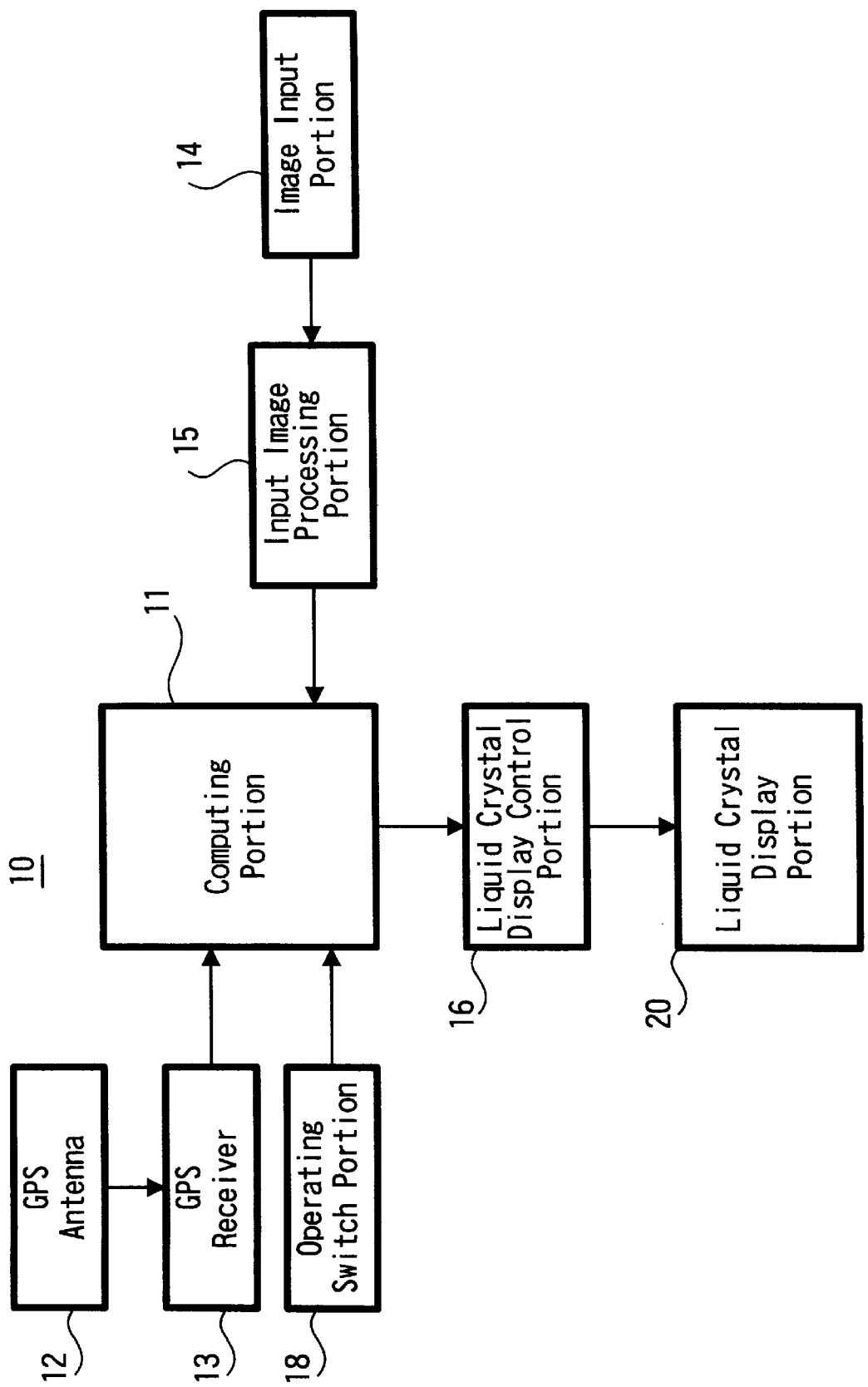
FIG. 1 is a block diagram showing a structure example according to an embodiment of the present invention.

In the present example, a receiver (GPS receiver) of a positioning system called GPS for which artificial satellites are used is incorporated to form a display for displaying a map of a vicinity of a present position obtained by positioning. FIG. 1 shows the entire structure and a position information display 10 has a computing portion 11 formed of a microprocessor for controlling a position positioning processing and a map display processing. The computing portion 11 may have a computing function such as a clock function annexed to map display and position positioning. Positioning of an absolute present position is carried out by the GPS receiver 13 to which a GPS antenna 12 is connected and position data obtained by the positioning is supplied to the computing portion 11. In the present example, the absolute position data is data of longitude and latitude of the position.

The position information display 10 of the present example has an image input portion 14 formed of a line sensor or the like, image data read by the image input portion 14 is converted into bitmapped data by an input image processing portion 15, and the bitmapped data is stored in a memory (not shown) in the input image processing portion 15. The stored image data is read out by the computing portion 11 and displayed.

As a structure for carrying out display under the control of the computing portion 11, there is a liquid crystal display control portion 16 connected to the computing portion 11 and display of images and characters is carried out by a liquid crystal display portion 20 by driving by the liquid crystal display control portion 16.

Figure 2:
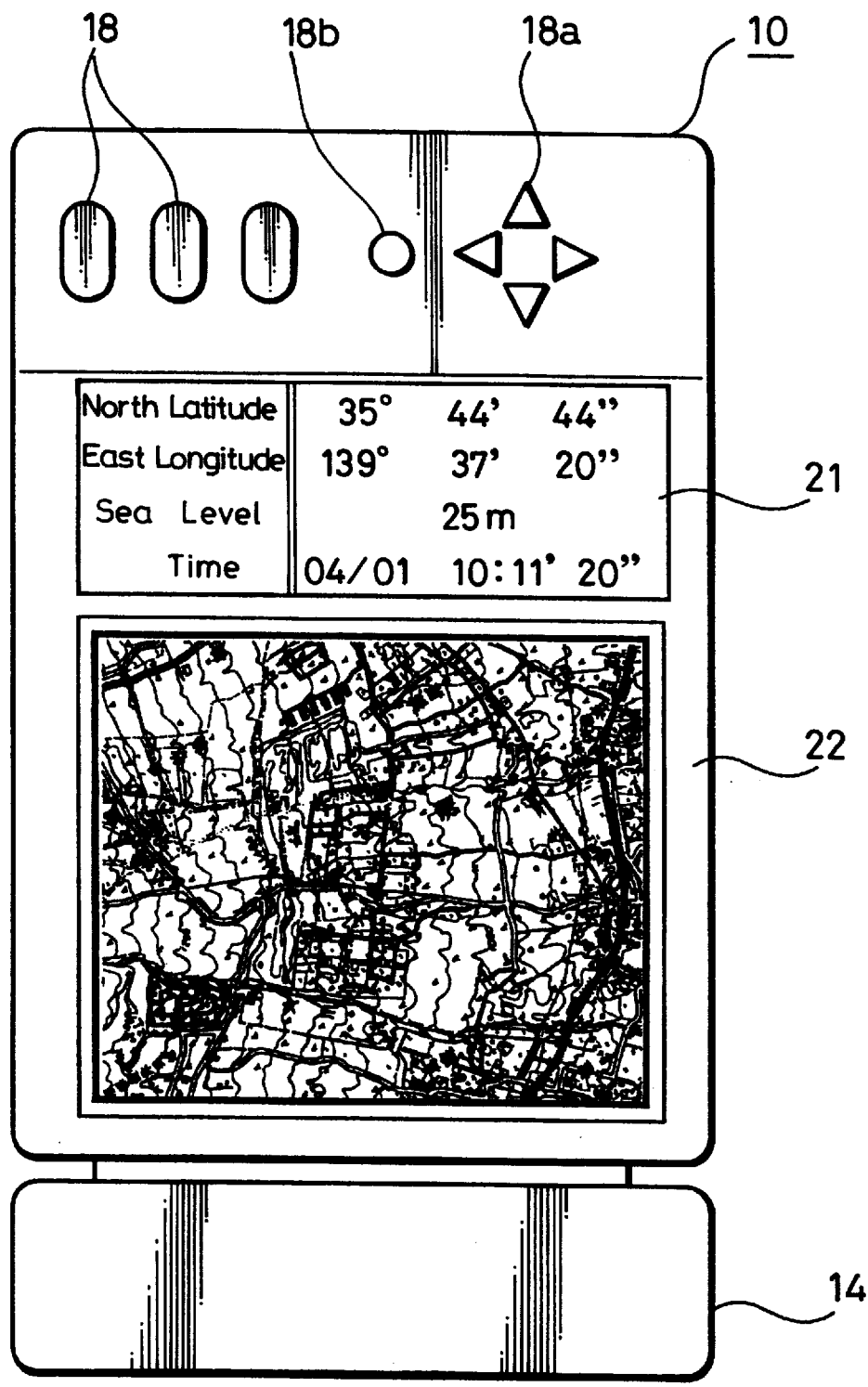
FIG. 2 is a front view of an example of a shape of a system according to the embodiment of the invention.

FIG. 2 shows an example of a shape of the position information display 10 of the present example. In the case of the present example, a coordinates display portion 21 for displaying longitude and latitude information and the like as characters, numerals, and the like and a map display portion 22 for displaying map images and the like are provided as the liquid crystal display portion 20. In a predetermined position (an upper portion in this example) of the device main body, operating switches 18 are disposed. Here, as a part of the operating switches, direction designating keys 18a formed of four keys for designating directions of up, down, left, and right and a confirmation key 18b for confirming an operation are provided. The image input portion 14 is connected to a lower portion of the device main body. If the image input portion 14 is formed of the line sensor, for example, the image is read by placing the image input portion 14 on printed matter to be read and moving the sensor longitudinally or laterally on the printed matter. Instead of the line sensor, an image input portion (image input portion similar to a so-called video camera) for which a CCD area sensor or the like is used may be provided as the image input portion 14 in which an image can be input without moving the sensor.

Figure 3:
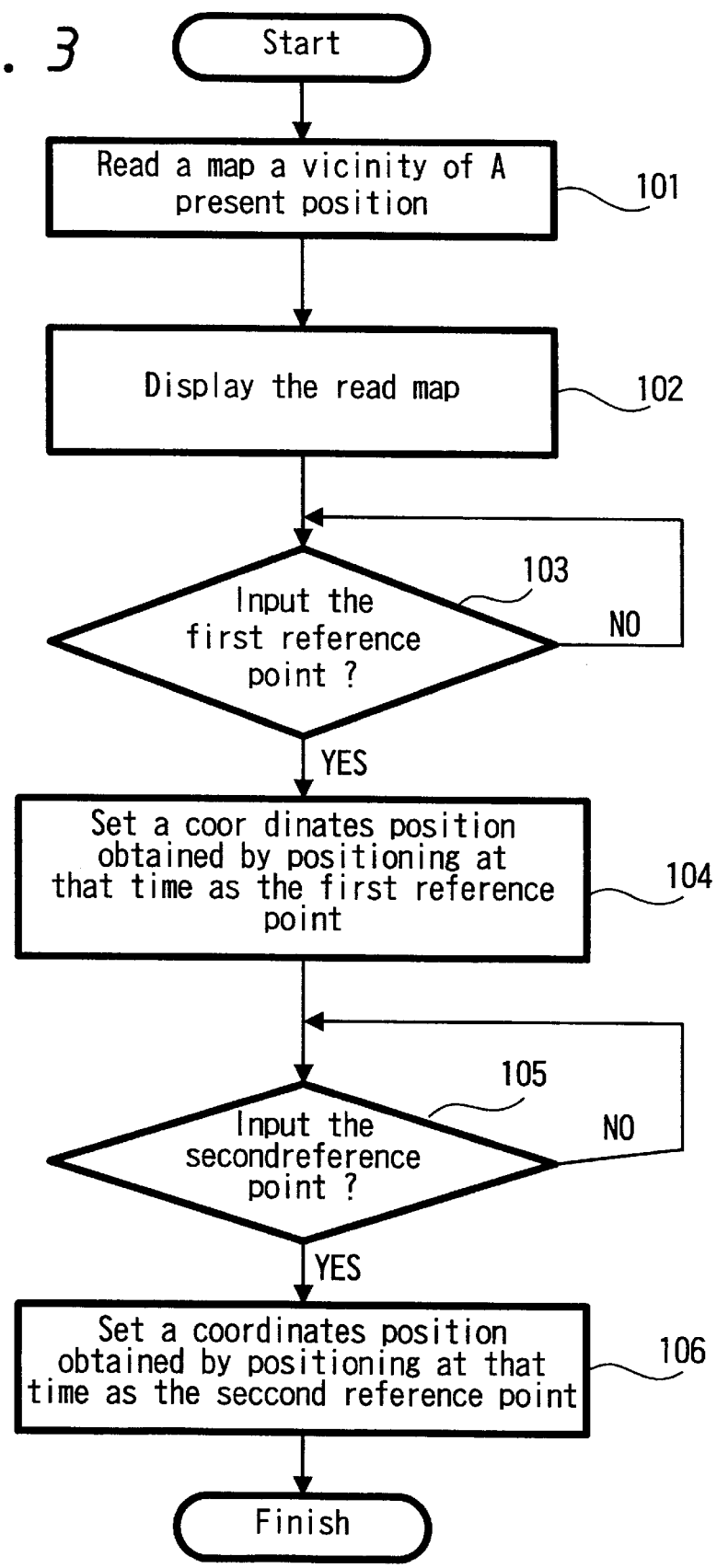
FIG. 3 is a flowchart showing an example of a reference position designation processing according to the embodiment of the invention.

In displaying a map by using the position information display 10 of the present example, a map printed on printed matter or the like is prepared, the map is read by the image input portion 14, and then, reference positions are set on the map. Next, the processing for inputting the map image and the processing for setting the reference positions on the read map will be explained by reference to a flowchart in FIG. 3.

First, the map of the vicinity of the present position is read by the image input portion 14 (step 101). Then, under the control of the computing portion 11, the read map is displayed on the map display portion 22 of the liquid crystal display portion 20 (step 102). As display of the map at this time, the whole one read map may be displayed on the map display portion 22 or only a vicinity of a central portion of the map may be displayed and a displayed range may be scrolled by operating the direction designating keys 18a, for example. It is also possible that the display may be zoomed in and out freely.

In a state in which the read map image is displayed, input operations of first and second two reference points are carried out. The input operations of the reference points are carried out by operation by a user of the position information display 10 when the user defines a place that is a distinct position on the map as the present position, for example. Specifically, when the user judges that the present position is in front of the distinct place such as an intersection, a forecourt of a station, a bridge, and a building on the map, the input operation of the reference point is carried out. As the input operation of the reference point, the displayed range of the map is scrolled in an arbitrary direction by operating the direction designating keys 18a to align some mark displayed at the central portion of the map display portion 22 with a position considered to be the present position and the confirmation key 18b is operated to confirm the input when the mark displayed at the central portion is considered to be aligned with the present position, for example.

Figure 4:
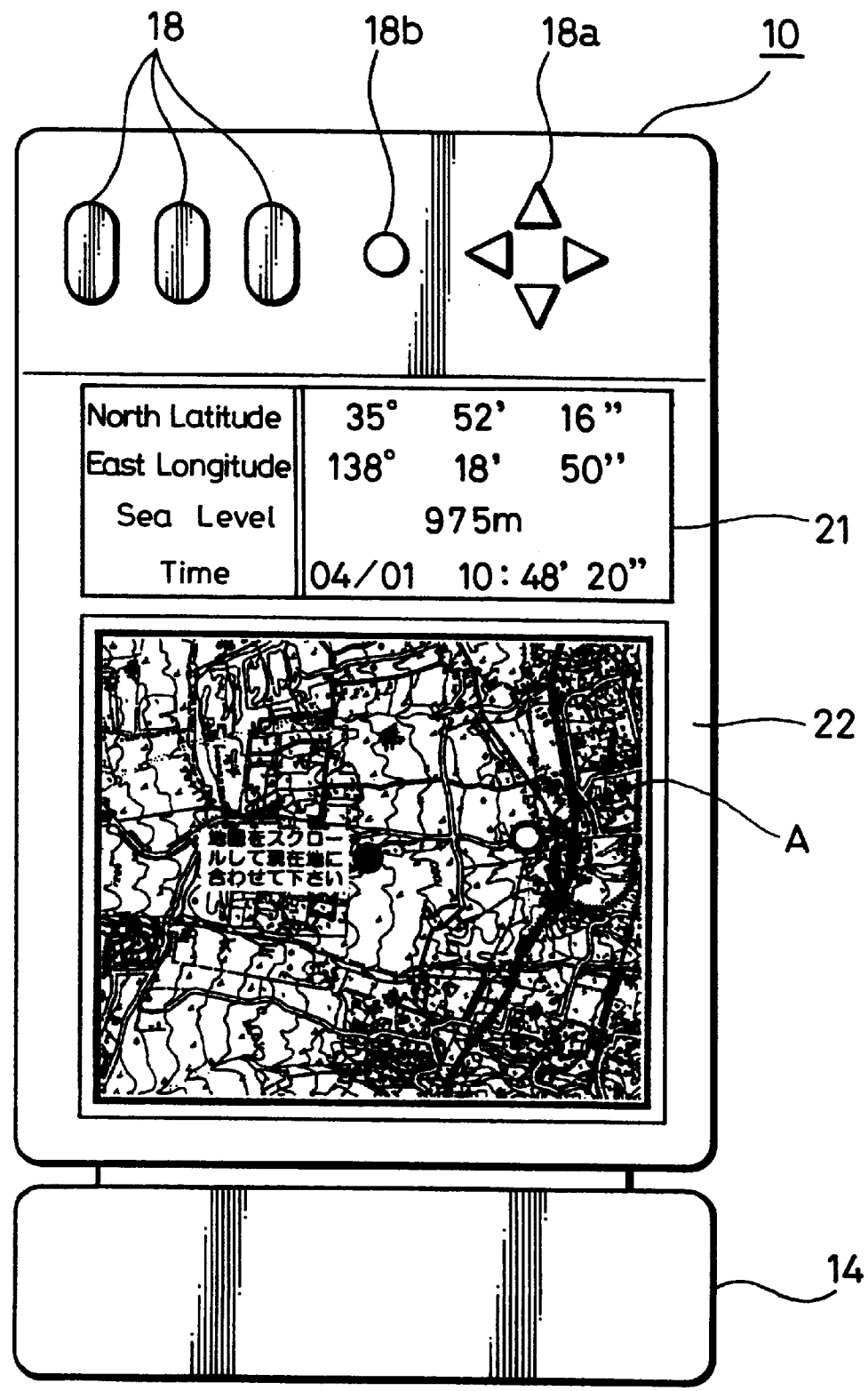
FIG. 4 is a front view of an example of display at the time of designation of a first reference position according to the embodiment of the invention.

In the computing portion 11 in the position information display 10, whether such an input operation (here, a point input first is defined as the first reference point) of the reference point has been carried out is judged (step 103). If such an input operation has been carried out, positioning of an absolute coordinates position of the input point is conducted by the GPS receiver 13 and the absolute coordinates position obtained by positioning at that time and information of the position of the first reference point on the map are stored in the memory (not shown) in the computing portion 11 (step 104). It is possible that the position set as the first reference point is represented by some mark on the displayed map when the first reference point is input. For example, the set first referent point A is represented by a circular mark as shown in FIG. 4. When a setting operation of the first reference point is carried out, words ("Scroll the screen and align with the present position" in this example) for providing instructions for operating may be displayed simultaneously on the map display portion 22 (or the coordinates display portion 21), for example, as shown in FIG. 4.

Figure 5:
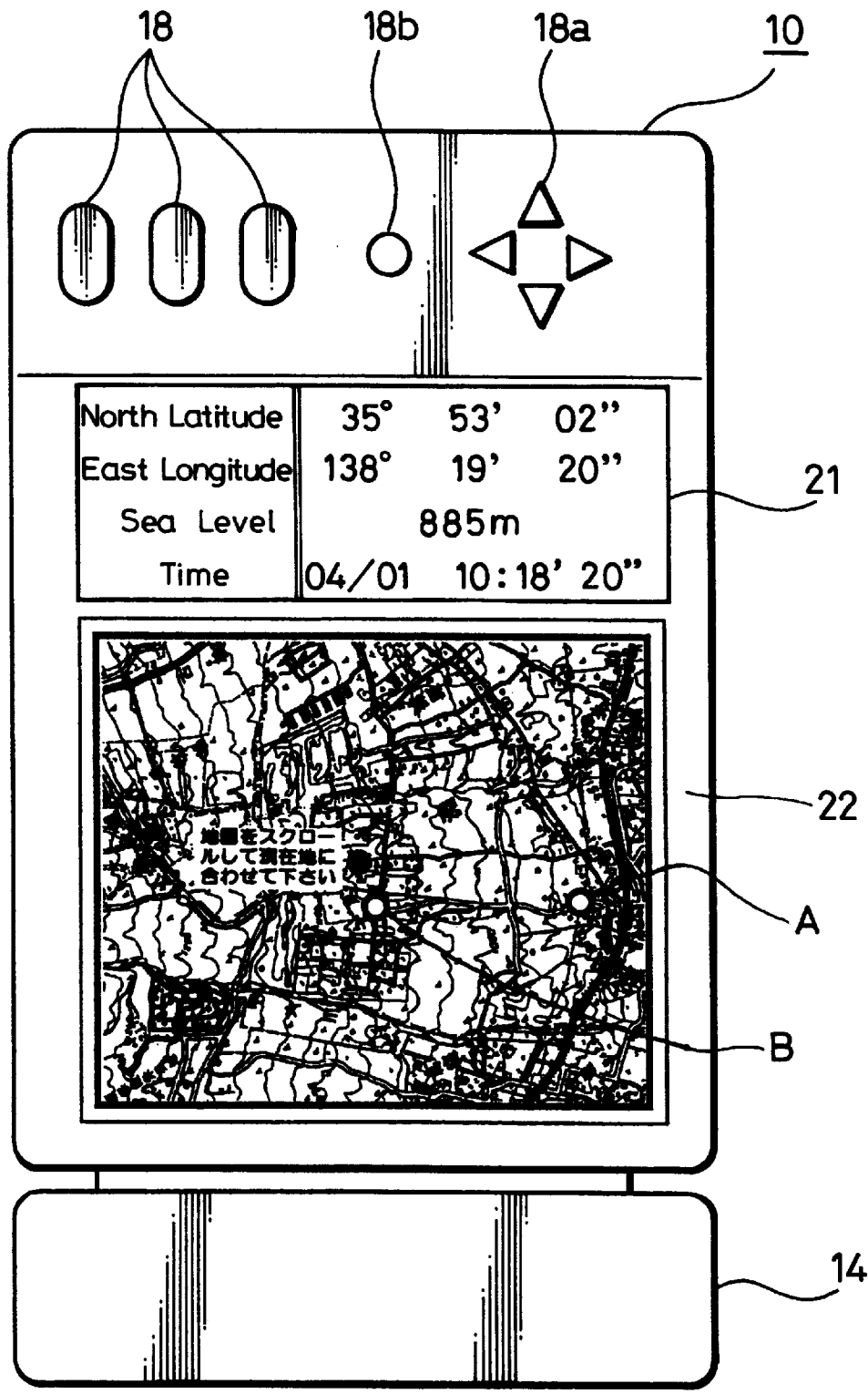
FIG. 5 is a front view of an example of display at the time of designation of a second reference position according to the embodiment of the invention.

Whether a further input operation of the reference point (the point input at this second time is defined as the second reference point) has been carried out at a place other than the first reference point is judged (step 105). When the input operation of the reference point has been carried out, positioning of an absolute coordinates position of the input point is conducted by the GPS receiver 13 and the absolute coordinates position obtained by positioning at that time and information of the position of the second reference point on the map are stored in the memory in the computing portion 11 (step 106). It is possible that the position set as the second reference point is represented by some mark on the displayed map when the second reference point is input. For example, the set second referent point B is represented by a circular mark as shown in FIG. 5. At this time again, words for providing instructions for operating may be displayed.

Figure 6:
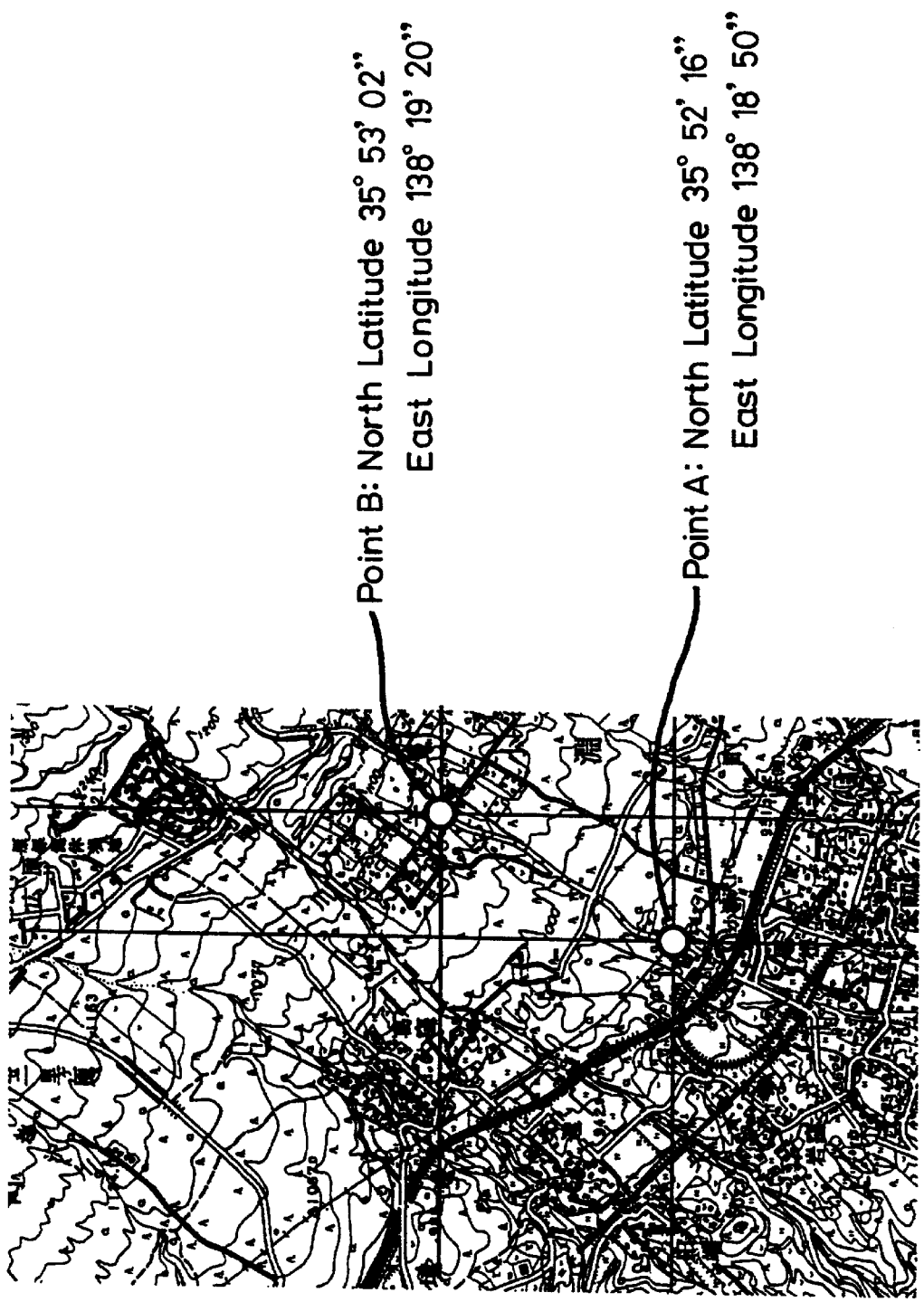
FIG. 6 is an explanatory view showing an example of reference positions set on a map by the embodiment of the invention.

FIG. 6 shows an example of positions of reference points and information of absolute coordinates when the first reference point and the second reference point are set in the above manner. The absolute coordinates information is expressed in terms of the latitude and longitude.

Figure 7:
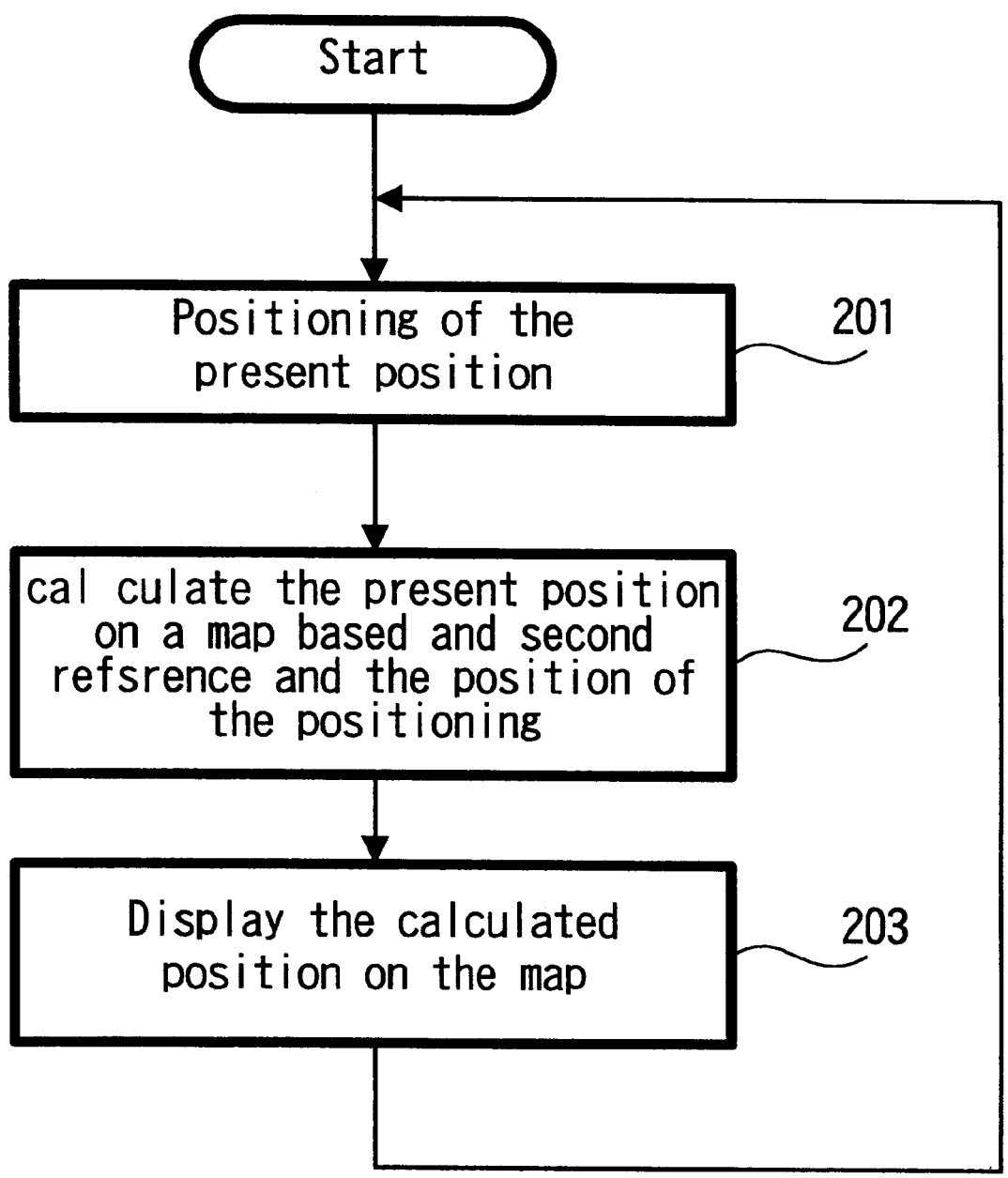
FIG. 7 is a flowchart showing an example of a position display processing according to the embodiment of the invention.

By setting the first and second reference points, the position information display 10 of this example can display the accurate present position on the map as long as the display 10 is in the displayed range of the map read by the image input portion 14. A flowchart in FIG. 7 shows a processing for displaying the position on the map. In a mode in which the present position is displayed, the computing portion 11 causes the GPS receiver 13 to conduct positioning of the absolute coordinate position of the present position at any time (step 201). Then, the present position on the map is calculated based on relationships among positions of the three points, i.e., the absolute coordinates position of the present position obtained by the positioning, the absolute coordinates position of the first reference point, and the absolute coordinates position of the second reference point (step 202).

In other words, the positions of the first reference point and the second reference point on the map have been input by the above setting processing of the reference points. Therefore, by conducting computation for aligning two vertexes corresponding to the first and second reference points of a triangle with the displayed first and second reference points on the map, with the triangle being obtained by computation and having three coordinates positions, i.e., the present position and the first and second reference points as the vertexes, the point on the map corresponding to the rest of the vertexes of the triangle is the present position.

Figure 8:
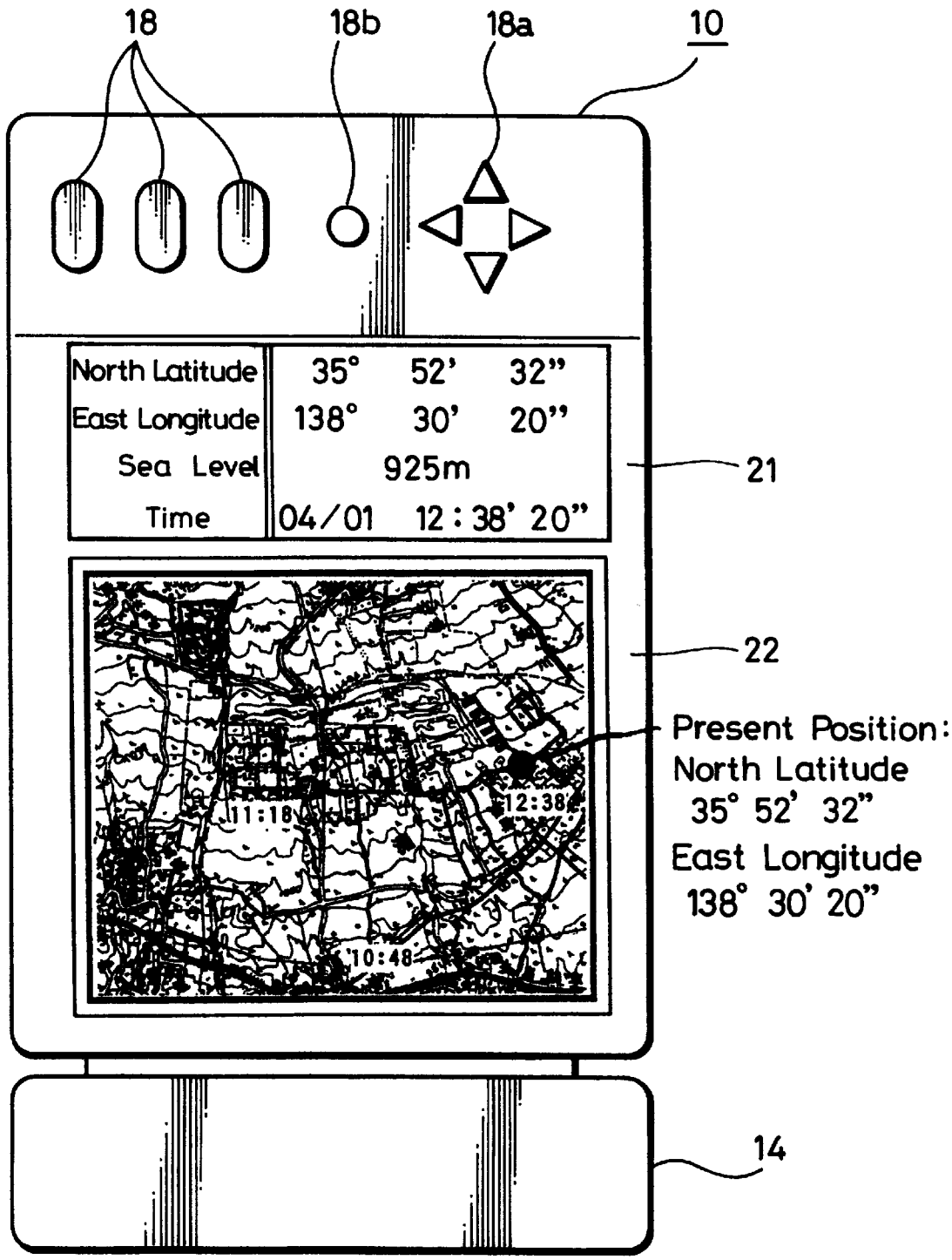
FIG. 8 is a front view showing an example of a present position display according to the embodiment of the invention.

Then, the calculated present position on the map is represented by a mark or the like on the map displayed on the map display portion 22 (step 203). At this time, it is preferable that the mark representing the present position is distinct from the marks representing the first and second reference points. FIG. 8 shows an example of display of the present position in this manner. In this example, the present position is displayed as well as the first and second reference points. It is also possible that a locus or the like showing a change from the second reference point to the present position is displayed. The display of the first and second reference points may be erased. In the example in FIG. 8, times at which the first and second reference points were set and a time at which the present position was reached are displayed simultaneously on the map. Because the positioning is carried out by using time information from the satellite in the case of the GPS system, it is possible to obtain information of the time at which the positioning of the position is carried out. If the present position on the map calculated at step 202 is not in the range of the map displayed at that time on the map display portion 22, the displayed range may be scrolled automatically under the control of the computing portion 11 such that the present position is displayed.

When the processing at step 203 is completed and timing for carrying out positioning of the present position is right, the flowchart returns to step 201. The time that elapsed before the flowchart returns to the step 201 where positioning of the next present position is carried out, i.e., intervals between positioning of the present positions may be set in advance by a user.

As described above, according to the position information display 10 of this example, as long as the map read by the image input portion 14 is accurate to some extent, the present position is displayed on the read map displayed on the map display portion 22. Therefore, unlike the prior-art navigation system, it is unnecessary that the map information is stored in advance. Therefore, it is possible to obtain the device that can display the map of the vicinity of the present position by a simple structure. For example, in a case of walking around a tourist destination, a printed map of the area is obtained in advance, the map is read by the image input portion 14, and processing for inputting first and second reference points is carried out at distinct points such as the forecourt of the station, the intersection, and the like. Thus, it is possible to display the present position on the read map. In this case, the map to be read may be any available map with any scale as long as relationships among positions are accurate. If the image input portion 14 is an input portion for which the CCD area sensor is used, it is also possible to take a picture of a map or the like printed on an information sign or the like and to carry out the reading processing, thereby improving ease of use.

Although positioning of the absolute coordinates positions at the first reference point and the second reference point is carried out once at each the reference point in the above embodiment, the positioning may be carried out a plurality of times to increase accuracy of the positioning. In other words, in positioning of the absolute coordinates position by the GPS system, there are positioning errors determined in use of the system, e.g., an error of about tens of meters in some cases. To avoid an influence of the errors, positioning of the absolute coordinates position at the first reference point or the second reference point may be carried out a plurality of times by the GPS receiver 13 and an average may be used as the absolute coordinate position of each the reference point. It is also possible to carry out a known positioning error correcting processing like in a differential GPS or the like.

By setting the first reference point and the second reference point, a distance between the two points can be obtained and a scale of a map displayed on the map display portion 22 can be judged by the computing portion 11. Therefore, it is possible to display values of the scale of the displayed map or a scale of distance on the map displayed on the map display portion 22 (or the coordinates display portion 21) based on the judged scale. It is also possible to judge cardinal points of the map displayed on the map display portion 22 based on setting of the first reference point and the second reference point and to display marks or the like representing the cardinal points. At time when the cardinal points can be judged, a preset cardinal point may be displayed on an upper portion of the screen (e.g., the north is on the upper portion of the screen) continuously.

Although the first and second two reference points are set and the displayed position of the present position on the map is calculated based on the two reference points and the present position in the above embodiment, it is also possible that more reference points can be set in advance and the displayed position of the present position on the map is calculated based on the three or more reference points and the present position, thereby improving the display accuracy.

Although the image input portion that is reading means of map information is integrated with the position information display 10 in the above embodiment, it is also possible that the reading means of the map information is formed separately from the device main body and the map information read by the separate reading means is supplied to and stored in the device main body.

Although the GPS system is used for positioning of the absolute position in the above embodiment, it is also possible to carry out the positioning of the absolute position by using other positioning systems.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A map display comprising:

image reading means for reading a map provided by a user and producing map image data;

memory means for storing said map image data;

display means for displaying said map formed of said map image data read out from said memory means;

positioning means for carrying out positioning of an absolute present position;

input means for setting first and second reference points on said map by said user designating first and second known positions to said user and obtained by said positioning means when moved to said first and second known positions; and control means for calculating and displaying on said map an actual position corresponding to said absolute present position obtained by said positioning means based on said first and second reference points set by said input means.

2. The map display according to claim 1 further comprising image reading means for reading said map image data for storage in said memory means.

3. The map display according to claim 1, wherein said positioning means carries out positioning of a same position a plurality of times when a specific position is designated on said map by said input means and an average position of positions obtained by said positioning means is judged to be an absolute position of said position.

* * * * *